United States Patent Office 3,357,985
Patented Dec. 12, 1967

3,357,985
BENZOTHIOXANTHENE DICARBOXYLIC ACID
IMIDE DYESTUFFS
Otto Fuchs and Helmut Troster, Frankfurt am Main, Germany, assignors to Farbwerke Hoechst Aktiengesellschaft vormals Meister Lucius & Brüning, Frankfurt am Main, Germany, a corporation of Germany
No Drawing. Filed July 18, 1966, Ser. No. 565,680
Claims priority, application Germany, July 30, 1965, F 46,762
9 Claims. (Cl. 260—281)

The present invention relates to new benzothioxanthene dyestuffs and a process for preparing them, particularly it relates to dyestuffs of the general formula

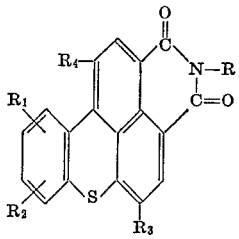

wherein R represents a hydrogen atom, an alkyl, cycloalkyl or aryl group, which may be substituted, a heterocyclic ring or a hydroxy or amino group, $R_1$ and $R_2$ stand for hydrogen or halogen atoms, alkyl, aryl, alkoxy, cyano, hydroxy, carbalkoxy acyloxy or amino groups, $R_3$ represents an alkoxy group, which may be substituted, and $R_4$ stands for a hydrogen atom or an alkoxy group, which may be substituted.

We have found that dyestuffs of the general formula

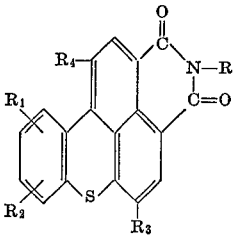

wherein R represents a hydrogen atom, an alkyl, cyloalkyl or aryl group, which may be substituted, a heterocyclic ring or a hydroxy or amino group, $R_1$ and $R_2$ stand for hydrogen or halogen atoms, alkyl, aryl, alkoxy, cyano, hydroxy, carbalkoxy, acyloxy or amine groups, $R_3$ represents an alkoxy group, which may be substituted, and $R_4$ stands for a hydrogen atom or an alkoxy group, which may be substituted, can be prepared.

(a) By heating in the presence of copper or copper salts the diazo salts of 4-(2'-aminophenylmercapto)-naphthalic acide imides of the general formula

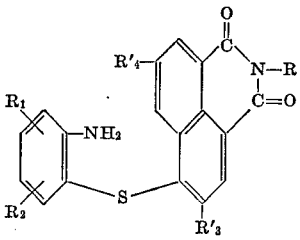

wherein R, $R_1$ and $R_2$ have the above meanings, $R'_3$ stands for a hydroxy group or an alkoxy group, which may be substituted, and $R'_4$ represents a hydrogen atom, a hydroxy group, or an alkoxy group, which may be substituted, or (b) By heating in the presence of copper or copper salts, the diazo salts of 4-(2'-aminophenylmercapto)-naphthalic acids or of the corresponding naphthalic acid anhydrides and condensing the benzothioxanthene derivatives thus obtained of the general formulae

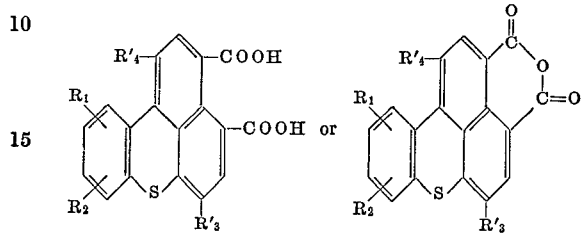

with compounds of the general formula

R—$NH_2$ wherein R, $R_1$, $R_2$, $R'_3$ and $R'_4$ having the aforesaid meanings, and by subsequently alkylating the dyestuffs obtained if there are used starting compounds, wherein $R'_3$ and/or $R'_4$ stand for a hydroxy group.

The cyclization according to the embodiments (a) and (b) can be accomplished in different ways. The diazo solution or suspension in acetic or mineral acid can either be introduced into a boiling aqueous neutral, acid or also basic copper salt solution, or mixed with a copper salt solution and heated afterwards, or copper powder is stirred into the diazo solution and the solution is heated afterwards, until the evolution of nitrogen is terminated. It is suitable to carry out the cyclization at temperatures between about 70° and 110° C.

The dyestuffs obtained according to embodiment (a) can be isolated as usual.

After the usual isolation, the benzothioxanthene derivatives obtained at first according to the embodiment (b) are converted into the dyestuffs by condensation with compounds of the formula R—$NH_2$ mentioned above. Hereby, it is expedient to heat, for a prolonged time, if necessary, under pressure, the substituted or unsubstituted benzothioxanthenedicarboxylic acids or their anhydrides with excess ammonia or amine in water or an inert organic solvent, as for instance methanol, ethanol, isopropanol or an ethyleneglycolmonoalkylether. Preferably, the condensation is accomplished at a temperature between about 70° and 160° C. The dyestuffs formed precipitate from the reaction mixture and can be isolated as usual. Besides ammonia, hydroxylamine and hydrazines, there may be used as amines for the condensation with the benzothioxanthenedicarboxylic acids or their anhydrides, aliphatic, cycloaliphatic, aromatic, araliphatic and heterocyclic amines, as for instance methylamine, ethylamine, butylamine, isopropylamine, ethanol- or propanolamine, methoxyethyl-, methoxypropyl- or methoxybutylamines, butoxypropylamines, isopropoxypropylamines, methoxyethoxypropylamines, β-ethoxy-β'-(Ω-aminopropoxy)-diethylether, acetoxyethylamines, cyclohexylamine, cyclohexoxypropylamines, anilines, anisidines, xylidines, cyclohexylanilines, phenylethylamine, 5-aminobenzoxazol and 2-amino-3-methoxydiphenyleneoxide.

The subsequent alkylation of those dyestuffs which are obtained, if starting compounds are used, wherein $R'_3$ and/or $R'_4$ stand for a hydroxy group, is performed in the way usual for the alkylation of phenols. As alkylation agents there are particularly concerned alkyl-halides, dialkyl-sulfates, arylsulfonic acid esters and alkylene-oxides, as for instance benzylchloride, dimethylsulfate, diethylsulfate, p-toluenesulfonic acid methylester, ethylene-oxide or propylene-oxide.

The 4-(2'-aminophenylmercapto)-naphthalic acid imides used according to embodiment (a) can be prepared in known way, by condensing, if desired in the presence of agents having a basic reaction, 4-bromo- or 4-chloronaphthalic acid imides substituted in 3-position by hydroxy group or an alkoxy group which may be substituted and which may contain in 6-position a hydroxy group or an alkoxy group which may be substituted, with unsubstituted or substituted o-amino- or o-nitrothiophenols in organic solvents, such as for instance ethanol, butanol, glycolmonoalkylethers, dimethylformamide or pyridine, and by subsequently reducing the nitro group of the o-nitrothioethers formed in one case to the amino group, or by reacting in the same way correspondingly substituted 4-mercaptonaphthalic acid imides with unsubstituted or substituted o-nitrochlorobenzenes and by converting the o-nitrothioethers obtained into the amino compounds.

The preparation of the compounds used for the embodiment (b) can be accomplished correspondingly, by using instead of the naphthalic acid imides the corresponding naphthalic acids or their anhydrides.

The compounds obtainable according to the process of the present invention are new valuable orange-yellow to orange dyestuffs with high tinctorial strength, which are excellently adapted for dyeing synthetic materials, e.g., polyethyleneglycol-terephthalate, polyamides or cellulose acetate. They yield brilliant shades showing very good fastness properties, especially very good fastnesses to light, to wetting and to thermofixation.

The following examples serve to illustrate the invention, but they are not intended to limit it thereto, the parts being by weight unless otherwise stated.

*Example 1*

42.2 parts of 3-methoxy-4-(2'-aminophenylmercapto)-naphthalic acid-N-γ-methoxypropylimide are suspended in 300 parts of glacial acetic acid and converted into the hydrochloride by adding 25 parts of concentrated hydrochloric acid. After adding 50 parts of water, the whole is diazotized at 0°–5° C. with a solution of 7.2 parts of sodium nitrite in 40 parts of water. The diazo solution is then diluted with 150 parts of water and dropwise introduced into a boiling solution of 70 parts of copper sulfate in 1000 parts of 10% acetic acid.

When the evolution of nitrogen has ceased, the reaction product precipitated in orange red flakes is filtered with suction, washed with water and methanol and dried.

*Analysis.*—Calculated: C, 68.2; H, 4.7; N, 3.5; S. 7.9. Found: C, 68.2, 68.3; H, 4.8, 4.9; N, 3.4, 3.7; S, 7.7, 7.8.

The dyestuff obtained with a very good yield dyes polyester fibres brilliant orange yellow shades having very good fastnessess to wetting and thermofixation.

*Example 2*

(a) 20 parts of concentrated hydrochloric acid are added to a suspension of 35.0 parts of 3-hydroxy-4-(2'-aminophenyl - mercapto)-naphthalic acid-N-methylimide in 300 parts of glacial acetic acid and 100 parts of water. The hydrochloride formed is diazotized at 10°–15° C. with a solution of 7.5 parts of sodium nitrite in 20 parts of water. Thereupon, the clear diazo solution is dropwise introduced into 700 parts of boiling copper sulfate solution of 3% strength. The reaction product precipitated is filtered with suction, washed with water and dried.

(b) The red hydroxy compound is dissolved in 100 parts of aqueous sodium hydroxide solution of 3% strength and, at a temperature of 20°–40° C., diethylsulfate in excess is added dropwise in the course of 3 hours, an alkaline reaction being permanently provided for by adding aqueous sodium hydroxide solution of 10% strength. The reaction mixture is then heated for a short period to about 80° C., in order to destroy the diethylsulfate in excess. Thereafter, the dyestuff precipitated is filtered off and washed with water, until it shows a neutral reaction. An orange red powder is obtained, with which brightly orange yellow dyeings with very good fastness properties are obtained on polyester fibres.

*Example 3*

A mixture of 7.0 parts of 3-methoxy-4-(2'-aminophenylmercapto)-naphthalic acid anhydride and 75 parts of glacial acetic acid is stirred with 5.6 parts of concentrated hydrochloric acid and then diazotized at 10°–15° C. with a solution of 1.7 parts of sodium nitrite in 9 parts of water. Thereupon, the filtered diazo solution is diluted with 10 parts of water and dropwise introduced into a boiling solution of 15 parts of copper sulfate in 200 parts of acetic acid of 10% strength. The 6-methoxybenzothioxanthene-3.4-dicarboxylic acid anhydride is filtered with suction, washed with water and dried.

3.3 parts of the acid anhydride obtained are stirred for 4 hours at boiling temperature in 70 parts of dimethyl formamide with 1.2 parts of aniline. The dyestuff precipitated after cooling is filtered with suction, washed with methanol and dried. It dyes polyester orange yellow shades of very good fastnesses to light and thermofixation.

*Example 4*

A mixture of 15.6 parts of 3-methoxy-4-(2'-amino-5'-methoxyphenyl-mercapto)-naphthalic acid-N-γ-methoxypropylimide, 120 parts of glacial acetic acid and 10 parts of concentrated hydrochloric acid is diluted with 20 parts of water and diazotized at 0°–5° C. as usual. After dilution with 60 parts of water, the diazo solution is stirred into a boiling solution of 28 parts of copper sulfate in 440 parts of acetic acid of 10% strength. After having worked up the mixture in the usual manner, a dyestuff is obtained, with which orange yellow dyeings are obtained on polyester materials.

*Example 5*

9 parts of concentrated hydrochloric acid are added to a mixture of 20.3 parts of 3,6-dimethoxy-4-(2'-aminophenylmercapto) - naphthalic acid-N-γ-methoxypropylimide, 90 parts of glacial acetic acid and 45 parts of water. The hydrochloride formed is then diazotized at 15°–20° C. and, after dilution with 54 parts of water, the diazo solution is introduced dropwise into a boiling solution of 22.5 parts of copper sulfate in 270 parts of water and 45 parts of glacial acetic acid. The precipitating orange red dyestuff is isolated in the usual manner. The dyestuff dyes polyester fibres orange shades.

*Analysis.*—Calculated: C, 66.2; H, 4.8; N, 3.2; S, 7.4. Found: C, 66.1, 66.0; H, 5.1, 4.8; N, 3.4, 3.3; S, 7.7, 7.5.

*Example 6*

52.8 parts of 3,6-dimethoxy-4-(2'-amino-4'-chlorophenylmercapto)-naphthalic acid-N-γ-butoxypropylimide are converted, as indicated in Example 1, into the hydrochloride and diazotized. The diazo solution is then treated with a boiling solution of copper sulfate. On polyester fibres the orange red reaction product yields orange dyeings with good general fastness properties.

*Example 7*

19.5 parts of 6-hydroxybenzothioxanthene-3,4-dicarboxylic acid-N-γ-methoxypropylimide obtainable according to Example 2(a) are dissolved in a solution of 2.2 parts of sodium hydroxide in 300 parts of water. Thereafter, ethylene oxide is introduced at 80°–90° C. into the violet solution. When the reaction is terminated, the red reaction product precipitated is filtered with suction, washed with dilute sodium hydroxide solution and water and dried. The dyestuff obtained with very good yield dyes polyester brilliant orange yellow shades.

The following table lists further dyestuffs and their shades on polyethylene-terephthalate, which can be obtained according to the methods described in the preceding examples.
| | Dyestuff | Shade | | Dyestuff | Shade |
|---|---|---|---|---|---|
| 1 | 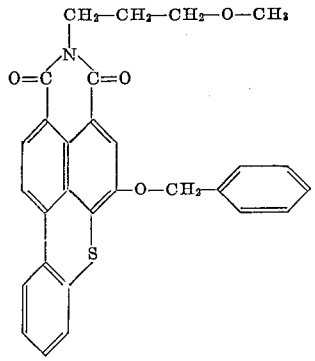 | Orange yellow. | 5 | 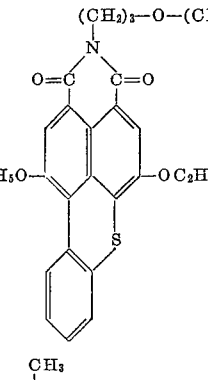 | Orange yellow. |
| 2 | 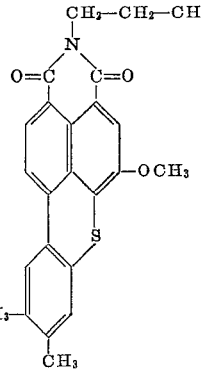 | Do. | 6 | 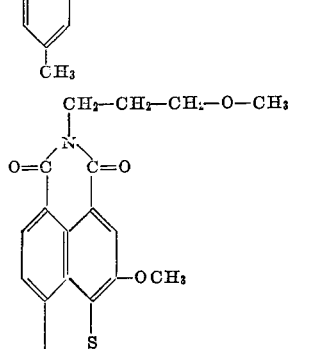 | Do. |
| 3 | 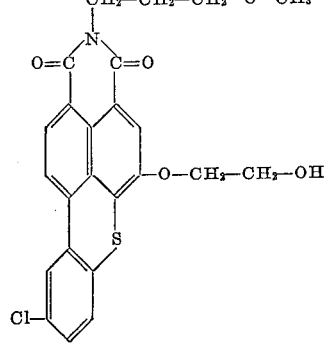 | Do. | 7 | 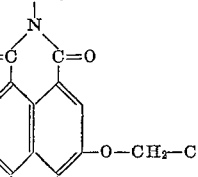 | Orange. |
| 4 | 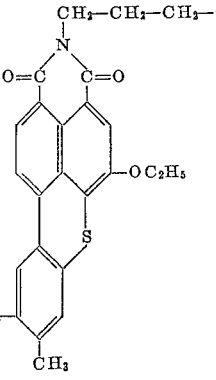 | Do. | 8 | 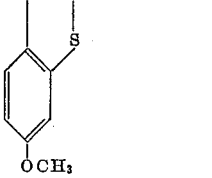 | Orange yellow. |

| | Dyestuff | Shade |
|---|---|---|
| 9 | 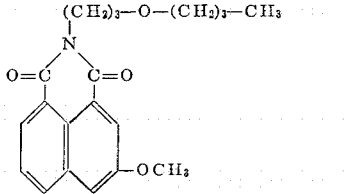 (CH₂)₃—O—(CH₂)₃—CH₃ ... OCH₃ ... OCH₃ | Orange yellow. |
| 10 | 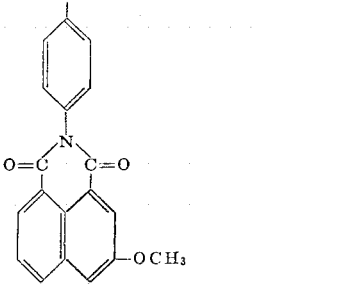 CH₃ ... OCH₃ ... Cl | Do. |
| 11 | 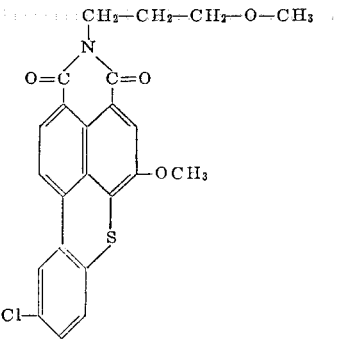 CH₂—CH₂—CH₂—O—CH₃ ... OCH₃ ... Cl | Do. |

We claim:

1. Dyestuff of the formula

wherein R is hydrogen, hydroxy, amino, lower alkyl, lower alkoxy lower alkyl, cyclohexyloxy lower alkyl, phenyl or lower alkyl phenyl, $R_1$ and $R_2$ are hydrogen, lower alkyl, lower alkoxy or halogen, $R_3$ is lower alkoxy, hydroxy lower alkoxy, phenyl lower alkoxy or -O-carboxylic acyl lower alkoxy and $R_4$ is hydrogen or lower alkoxy.

2. Dyestuff of the formula

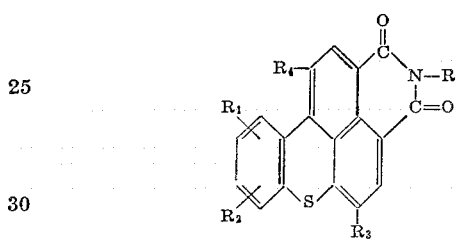

wherein R is lower alkyl, lower alkoxy lower alkyl, cyclohexyloxy lower alkyl, phenyl or tolyl, $R_1$ and $R_2$ are hydrogen, lower alkoxy, lower alkyl or chlorine, $R_3$ is lower alkoxy, hydroxy lower alkoxy, phenyl lower alkoxy or -O-acetyl-lower alkoxy and $R_4$ is hydrogen or lower alkoxy.

3. Dyestuff of the formula

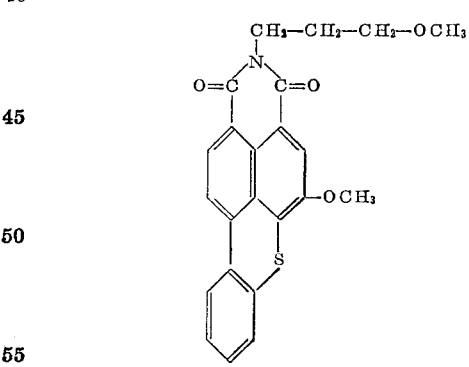

wherein R is methyl, γ-methoxy-propyl, γ-butoxypropyl, γ-cyclohexyloxy-propyl, phenyl or tolyl, $R_1$ and $R_2$ are hydrogen, methyl, methoxy or chlorine, $R_3$ is methoxy, ethoxy, β-hydroxy-ethoxy, β-acetoxy-ethoxy, or phenyl methoxy and $R_4$ is hydrogen, methoxy or ethoxy.

4. The dyestuff of the formula

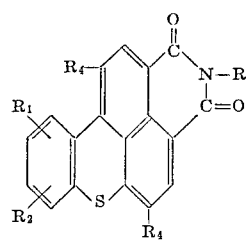

5. The dyestuff of the formula

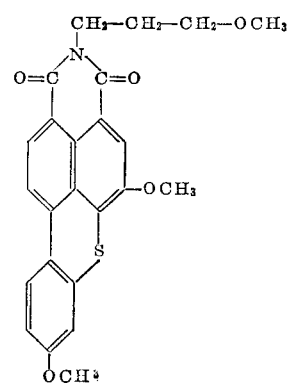

6. The dyestuff of the formula
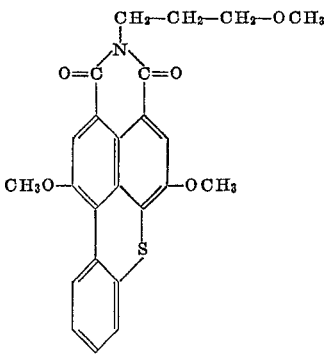
7. The dyestuff of the formula
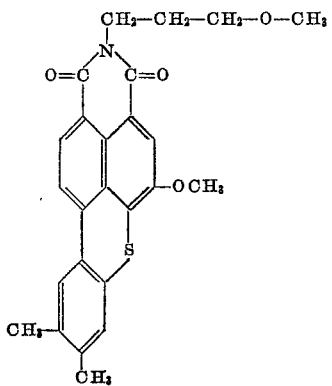
8. The dyestuff of the formula
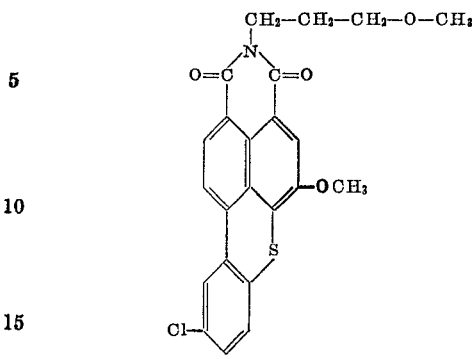
9. The dyestuff of the formula
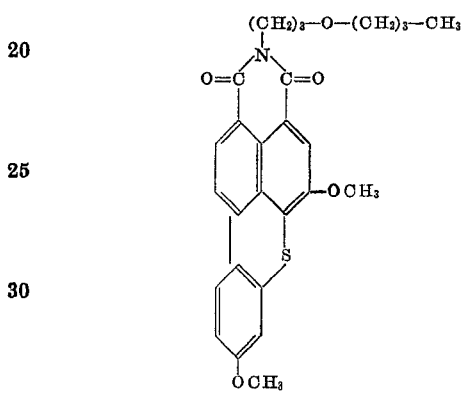
References Cited
UNITED STATES PATENTS
1,892,241  12/1932  Kranslein et al. _____ 260—281
2,487,105  11/1949  Cornwell _____ 260—281 X
OTHER REFERENCES
F150–02 IV b/22e, May 1956, German printed specification (Eckert).
Surrey, Name Reactions, Academic Press, 1954, p. 83, 179, 150 relied on.
ALEX MAZEL, *Primary Examiner.*
D. G. DAUS, *Assistant Examiner.*